US012638114B2

(12) United States Patent
Sugita et al.

(10) Patent No.: US 12,638,114 B2
(45) Date of Patent: May 26, 2026

(54) HOSE JOINT

(71) Applicant: TOYOX CO., LTD., Toyama (JP)

(72) Inventors: Shuji Sugita, Toyama (JP); Kazuki Shimizu, Toyama (JP)

(73) Assignee: TOYOX CO., LTD., Toyama (JP)

( * ) Notice: Subject to any disclaimer, the term of this patent is extended or adjusted under 35 U.S.C. 154(b) by 16 days.

(21) Appl. No.: 18/992,418

(22) PCT Filed: Jul. 3, 2023

(86) PCT No.: PCT/JP2023/024601
§ 371 (c)(1),
(2) Date: Aug. 19, 2025

(87) PCT Pub. No.: WO2024/014338
PCT Pub. Date: Jan. 18, 2024

(65) Prior Publication Data
US 2026/0002618 A1     Jan. 1, 2026

(30) Foreign Application Priority Data

Jul. 15, 2022     (JP) ................................. 2022-113981

(51) Int. Cl.
F16L 33/23          (2006.01)

(52) U.S. Cl.
CPC ........... F16L 33/23 (2013.01); F16L 2201/10 (2013.01)

(58) Field of Classification Search
CPC ......... F16L 19/083; F16L 23/08; F16L 23/10; F16L 17/04; F16L 33/20; F16L 33/207;
(Continued)

(56) References Cited

U.S. PATENT DOCUMENTS

| | | | |
|---|---|---|---|
| 1,522,013 | A | 1/1925 | Goodall |
| 1,532,596 | A | 4/1925 | Madsen |

(Continued)

FOREIGN PATENT DOCUMENTS

| | | |
|---|---|---|
| GB | 233963 | 5/1925 |
| JP | 7-2694 | 1/1995 |

(Continued)

OTHER PUBLICATIONS

International Search Report issued in International Patent Application No. PCT/JP2023/024601, dated Sep. 12, 2023, along with an English translation thereof.
(Continued)

*Primary Examiner* — Aaron M Dunwoody
(74) *Attorney, Agent, or Firm* — GREENBLUM & BERNSTEIN, P.L.C.

(57) ABSTRACT

Provided is a hose joint that allows whether or not tightening has been completed to be determined. The hose joint includes: a nipple provided along an insertion space of the hose body, a sleeve deformable in a radial direction thereof and provided so as to surround an outer circumference of the insertion space of the hose body formed along an outer peripheral surface of the nipple, a plurality of separated holders provided outside the sleeve to cover an outer face of the sleeve in a circumferential direction thereof and be separable in the radial direction, and a tightening member provided to extend across the plurality of separated holders so as to move the individual separated holders closer together in the radial direction and cause diameter reduction of the sleeve, the hose joint further including a spacer disposed between each of the plurality of separated holders and the sleeve.

4 Claims, 9 Drawing Sheets

(58) Field of Classification Search
   CPC .............. F16L 33/2071; F16L 33/2073; F16L
                                33/2076; F16L 33/23
   See application file for complete search history.

(56)                    References Cited

U.S. PATENT DOCUMENTS

| | | | | | |
|---|---|---|---|---|---|
| 3,249,371 | A | * | 5/1966 | Peterman | F16L 33/23 |
| | | | | | 285/259 |
| 3,457,359 | A | * | 7/1969 | Soucy | F16L 11/127 |
| | | | | | 411/921 |
| 3,495,855 | A | * | 2/1970 | Currie | F16L 33/23 |
| | | | | | 285/259 |
| 6,659,510 | B1 | * | 12/2003 | Ikegami | F16L 25/0036 |
| | | | | | 285/251 |
| 10,781,948 | B1 | * | 9/2020 | Gregory | F16L 23/032 |
| 11,885,452 | B2 | * | 1/2024 | Muggulla | F16L 39/005 |
| 2008/0284161 | A1 | * | 11/2008 | Dole | F16L 17/04 |
| | | | | | 285/148.8 |
| 2012/0256415 | A1 | * | 10/2012 | Dole | F16L 21/005 |
| | | | | | 285/337 |
| 2017/0356584 | A1 | * | 12/2017 | Hagiya | F16L 27/108 |
| 2020/0309295 | A1 | * | 10/2020 | Belen | F16L 21/065 |
| 2022/0107042 | A1 | * | 4/2022 | Sumiyoshi | F16L 33/23 |
| 2022/0213993 | A1 | * | 7/2022 | Hagiya | F16L 27/108 |
| 2022/0290785 | A1 | * | 9/2022 | Sumiyoshi | F16L 19/083 |
| 2023/0105113 | A1 | * | 4/2023 | Muggulla | F16L 9/18 |
| | | | | | 285/149.1 |
| 2025/0347370 | A1 | * | 11/2025 | Sugita | F16L 25/01 |
| 2026/0002618 | A1 | * | 1/2026 | Sugita | F16L 21/08 |

FOREIGN PATENT DOCUMENTS

| | | |
|---|---|---|
| JP | 2009-85275 | 4/2009 |
| WO | 2011/058877 | 5/2011 |
| WO | 2015/156198 | 10/2015 |
| WO | 2021/220457 | 11/2021 |

OTHER PUBLICATIONS

Written Opinion issued in International Patent Application No. PCT/JP2023/024601, dated Sep. 12, 2023, along with an English translation thereof.

Japan, Decision to Grant a Patent in Japanese Patent Application No. 2022-113981, dated Nov. 14, 2023, along with an English translation thereof.

* cited by examiner (a)

(b)

(c)

E-E CROSS-SECTIONAL VIEW

H-H CROSS-SECTIONAL VIEW

HOSE JOINT

TECHNICAL FIELD

The present invention relates to a hose joint to be used to perform piping connection of a deformable hose body having flexibility, such as a hose or tube, which is formed of a soft material, e.g., a synthetic resin or rubber.

BACKGROUND ART

Conventionally, as a hose joint of this type, there is a hose connector including a nipple into which a hose can be inserted, a plurality of semi-cylindrical separated holders that can be fitted with the nipple, and an elastic deformation ring for tightening the hose wherein by inserting bolts into bolt holes in end parts of the plurality of separated holders and tightening the plurality of separated holders, the elastic deformation ring is deformed to evenly bite into an outer circumference of the hose so as to prevent leakage from the hose (see, e.g., PTL 1).

CITATION LIST

Patent Literature

PTL 1: Japanese Patent Application Publication No. 2009-85275

SUMMARY OF INVENTION

Technical Problem

In a hose joint of a type which brings a plurality of separated holders closer together by tightening bolts as described in PTL 1, a reaction force resulting from diameter reduction deformation of an elastic deformation ring is used normally, as a clue, to determine whether the tightening is sufficient. However, a certain degree of experience is required to be able to make this determination, and an inexperienced on-site worker or a less-experienced on-site worker tends to erroneously determine that a tightening operation is completed, even though the tightening is not fully completed. Insufficient tightening will obviously result in an exacerbated come-off strength of a hose, which easily causes a fluid leakage accident.

The present invention aims at coping with such a problem, and an object thereof is to provide a hose joint that allows even an inexperienced worker to determine whether or not tightening of a plurality of separated holders has been completed.

Solution to Problem

To attain the object, the present invention is a hose joint for connection of a hose body, the hose joint including: a nipple provided along an insertion space of the hose body; a sleeve deformable in a radial direction thereof and provided so as to surround an outer circumference of the insertion space of the hose body formed along an outer peripheral surface of the nipple; a plurality of separated holders provided outside the sleeve to cover an outer face of the sleeve in a circumferential direction thereof and be separable in the radial direction; and a tightening member provided to extend across the plurality of separated holders so as to move the individual separated holders closer together in the radial direction and cause diameter reduction of the sleeve, the hose joint further including a spacer disposed between each of the plurality of separated holders and the sleeve, the spacer being visually recognizable through a gap between the plurality of separated holders in a state where tightening is not completed, while the spacer is contained in concave parts of the plurality of separated holders to be completely visually unrecognizable in a state where the tightening is completed.

Advantageous Effects of Invention

According to the present invention including the features described above, it is possible to provide a hose joint that allows even an inexperienced worker to determine whether or not tightening of a plurality of separated holders has been completed.

BRIEF DESCRIPTION OF DRAWINGS

FIGS. 9(*a*)-9(*f*) are illustrative views illustrating an overall configuration of a hose joint according to another embodiment of the present invention, in which FIG. 9(a) is a front view, FIG. 9(b) is a top view, FIG. 9(c) is a left side view, FIG. 9(d) is an upper left perspective view, FIG. 9(e) is a side cross-sectional view of a sleeve, which is a component of the hose joint, and FIG. 9(f) is a perspective view of the sleeve.

DESCRIPTION OF EMBODIMENTS

Figure 1:
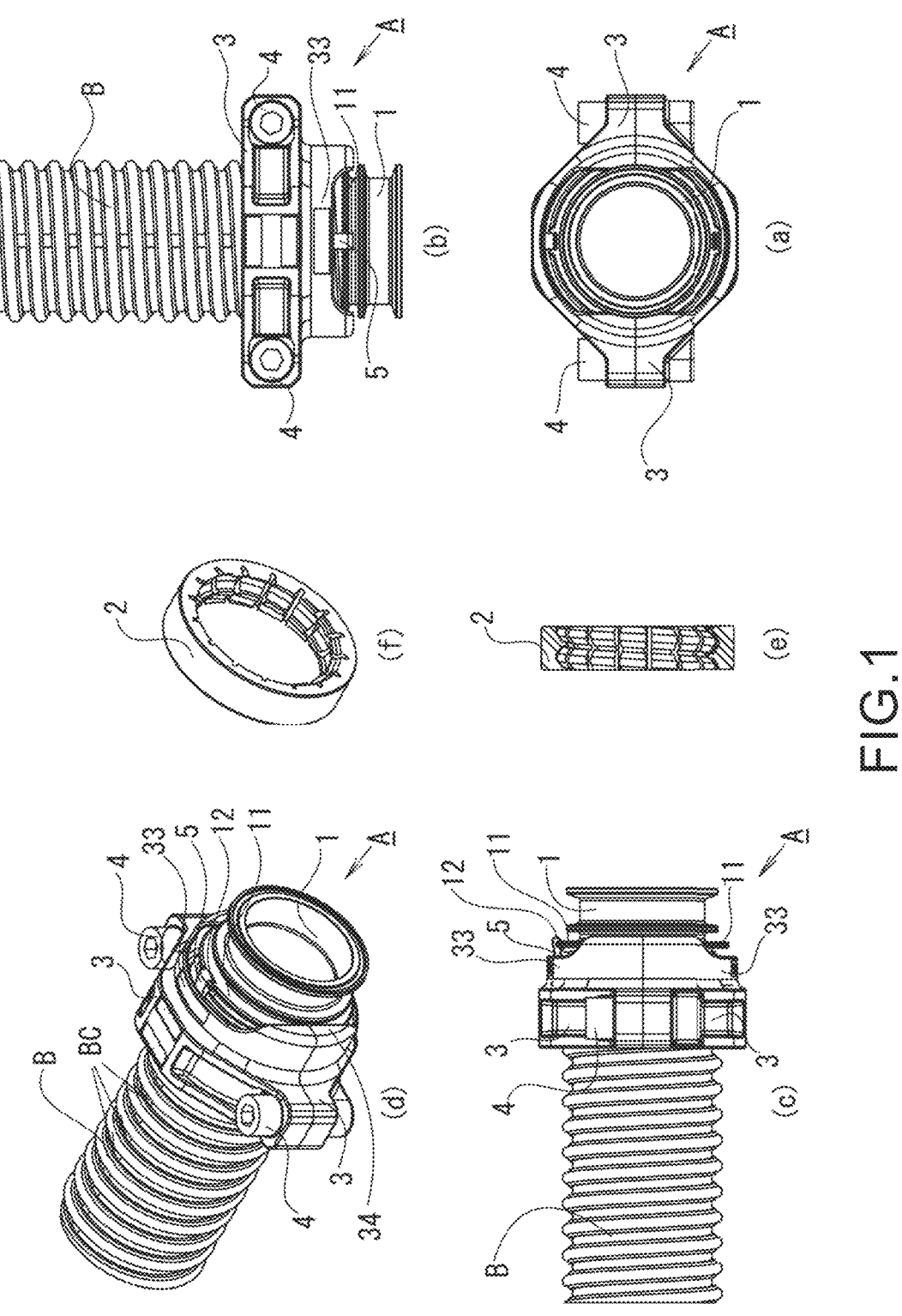
FIGS. 1(*a*)-1(*f*) are illustrative views illustrating an overall configuration of a hose joint according to an embodiment of the present invention, in which FIG. 1(*a*) is a front view, FIG. 1(*b*) is a top view, FIG. 1(*c*) is a left side view, FIG. 1(*d*) is an upper left perspective view, FIG. 1(*e*) is a side cross-sectional view of a sleeve, which is a component of the hose joint, and FIG. 1(*f*) is a perspective view of the sleeve.

Referring to the drawings, the following will describe each of embodiments of the present invention in detail.
(Configuration of Hose Joint in Embodiment)

Figure 2:
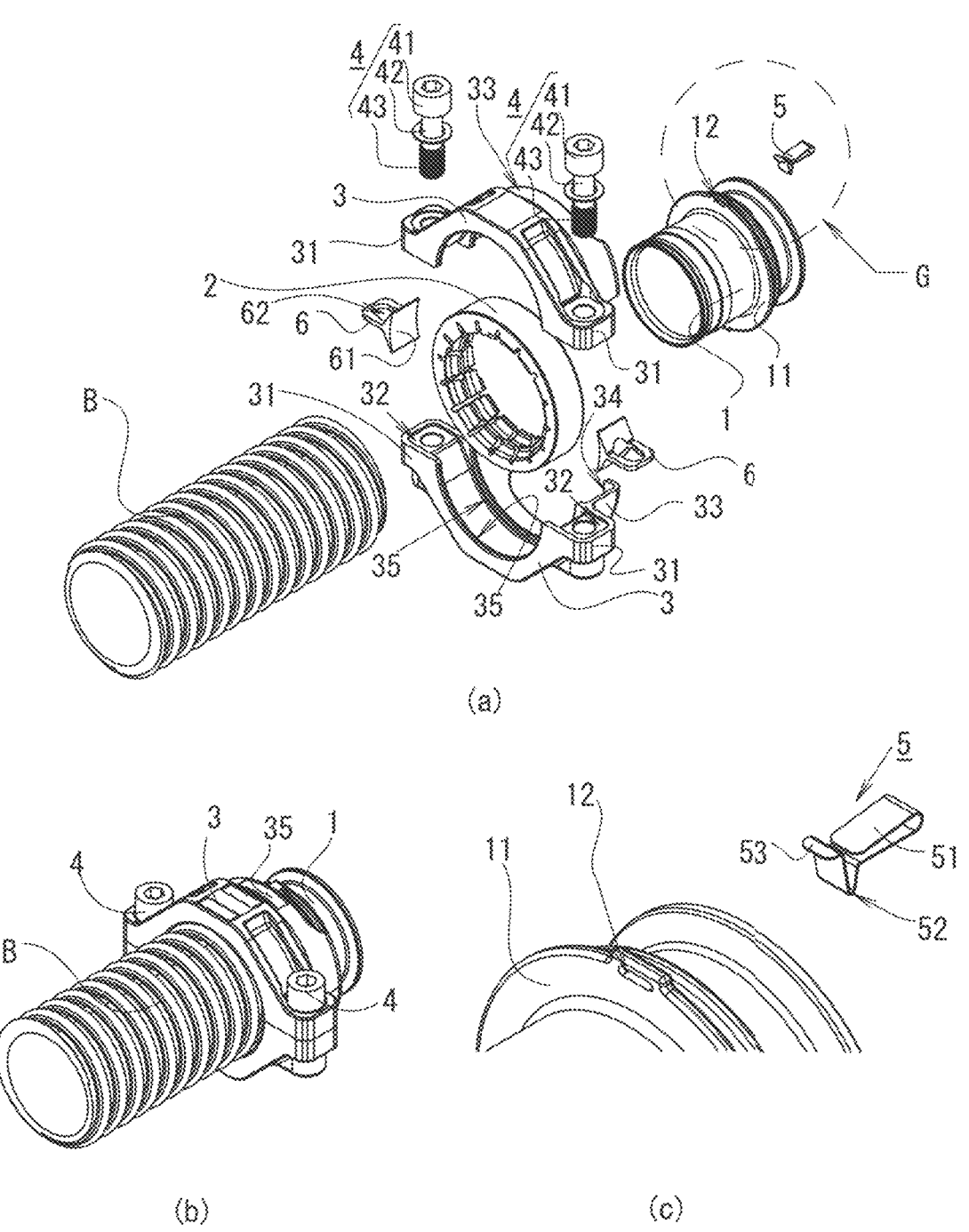
FIGS. 2(*a*)-2(*c*) are illustrative views illustrating the overall configuration of the hose joint according to the embodiment of the present invention, in which FIG. 2(*a*) is an exploded perspective view, FIG. 2(*b*) is an appearance perspective view after assembly, and FIG. 2(*c*) is an enlarged view of a portion G in FIG. 2(*a*).

FIG. 1 is an illustrative view illustrating an overall configuration of a hose joint according to the embodiment of the present invention, in which FIG. 1(a) is a front view, FIG. 1(b) is a top view, FIG. 1(c) is a left side view, FIG. 1(d) is an upper left perspective view, FIG. 1(e) is a side cross-sectional view of a sleeve, which is a component of the hose joint, and FIG. 1(f) is a perspective view of the sleeve. FIG. 2 is an illustrative view illustrating the overall configuration of the hose joint according to the embodiment of the present invention, in which FIG. 2(a) is an exploded perspective view, FIG. 2(b) is an appearance perspective view after assembly, and FIG. 2(c) is an enlarged view of a portion G in FIG. 2(a).

As illustrated in FIGS. 1(a) to 1(f) and FIGS. 2(a) to 2(c), a hose joint A according to the embodiment of the present invention is a hose joint for inserting, between a nipple 1 and a sleeve 2 deformable in a radial direction, a connection end part of a hose body B having a electrically conductive carbon line BC and including a reinforced member provided along an outer surface to spirally protrude, covering the outside of the sleeve 2 with a plurality of separated holders 3, and moving the individual separated holders 3 closer together in the radial direction with tightening members 4 to connect the separated holders 3 into a cylindrical shape, while simultaneously achieving grounding connection of the hose body B.

By moving the plurality of separated holders 3 closer together with the tightening members 4, the sleeve 2 is subjected to diameter reduction deformation which brings an inner face of the sleeve 2 into substantially even close contact with an outer surface of the connection end part of the hose body B all around the circumference thereof. At the same time, an inner surface of the hose body B is brought into close contact with an outer peripheral surface of the nipple 1 to achieve detachable piping connection. This allows even the large-diameter hose body B having a relatively large diameter dimension to be easily connected and easily assembled and decomposed, and therefore this is also appropriate for maintenance such as cleaning. The hose joint A is not limited to mere connection and, when the individual separated holders 3 are connected together, a grounding clip 5 locked to an outer circumference of the nipple 1 comes into contact with the conductive carbon line BC of the hose body B to achieve the grounding connection.

More specifically, the hose joint A according to the embodiment of the present invention includes, as principal components: the nipple 1 having electrical conductivity and provided along an insertion space of the hose body B, the sleeve 2 deformable in the radial direction and provided so as to surround an outer circumference of the insertion space of the hose body B formed along the outer peripheral surface of the nipple 1, the plurality of separated holders 3 provided outside the sleeve 2 to cover an outer face of the sleeve 2 in a circumferential direction and be separable in the radial direction, the tightening members 4 provided to extend between the plurality of separated holders 3 to move the individual separated holders 3 closer together in the radial direction and cause diameter reduction of the sleeve 2, the grounding clip 5 having electrical conductivity to be locked to the outer circumference of the electrically conductive nipple 1, and holder extension parts 33 extending in a hose insertion direction to be longer than a length of the sleeve 2.

Note that a direction in which the hose body B is to be inserted into the insertion space is hereinafter referred to as the "hose insertion direction", while a direction reverse to the hose insertion direction is hereinafter referred to as a "hose come-off direction".

The nipple 1 is made of, e.g., rust-resistant metal such as stainless steel or brass or a resin material having electrical conductivity, and is formed into a substantially cylindrical shape having a large thickness by cutting or casting or formed by press working or another forming process. A side of the nipple 1 to be connected to the hose body B has a cylindrical shape, while another side thereof has a shape appropriate for connection to another hose body (not shown) or a hose connection port (not shown) of another device. Specifically, to be connected to the other hose body, the nipple 1 is integrally formed with a cylindrical part such as a ferrule, a screw, or a bush.

The nipple 1 is formed to have an outer diameter substantially equal to, slightly larger than, or slightly smaller than an inner diameter of the hose body B described later.

The outer peripheral surface of the nipple 1 has, at predetermined positions in an axial direction thereof, a concave/convex part for hose retention, which is disposed to face the inner face of the sleeve 2 described later in the radial direction with the insertion space of the hose body B being interposed therebetween, and a flange 11 serving as a retaining means for restricting positions of the separated holders 3 described later such that the separated holders 3 are unmovable in the axial direction. In addition, as illustrated in the partially enlarged view in FIG. 2(c), locking holes 12 for locking through the grounding clip 5 described later are provided in two portions (of which only one portion is illustrated in the partially enlarged view) of the flange 11.

In a specific example of the nipple 1, as illustrated in FIG. 2(a), only a leading end part (end part in the hose come-off direction) of the outer peripheral surface thereof has a plurality of annular concave parts and annular convex parts which are alternately and continuously formed in the axial direction in rugged relation for hose retention.

Alternatively, in other examples, it is also possible to modify the nipple 1 by forming the outer peripheral surface thereof into a bamboo shoot shape in which annular concave parts and annular convex parts continuously alternate in the axial direction over a substantially entire length of the outer peripheral surface of the nipple 1 or provide the outer peripheral surface of the nipple 1 with an annular seal member that is pressed against the inner surface of the hose body B in the radial direction, though not shown.

The sleeve 2 is formed of an elastically deformable material such as, e.g., rubber or a soft synthetic resin into a substantially cylindrical shape which is elastically deformable at least in the radial direction, and is assembled to the outside of the outer peripheral surface of the nipple 1 so as to face the outer peripheral surface of the nipple 1 in the radial direction with the insertion space of the hose body B being interposed therebetween. The sleeve 2 has the inner face that faces and abuts on the outer surface of the connection end part of the hose body B attached to the outside of the outer peripheral surface of the nipple 1 in the radial direction during the assembly thereof and the outer face that faces inner side faces of the plurality of separated holders 3 described later in the radial direction during the assembly thereof.

The inner face of the sleeve 2 has an inner diameter which is set substantially equal to or slightly larger than an outer diameter of the hose body B described later during diameter expansion, while being set smaller than the outer diameter of the hose body B during the diameter reduction. In addition, as illustrated in FIG. 1(*e*), in the inner face of the sleeve 2, a spiral groove is formed so as to be able to correspond to a spiral shape of the reinforced member provided along the outer surface of the hose body B to protrude.

Meanwhile, the outer face of the sleeve 2 has an outer diameter during the diameter expansion which is set larger than an inner diameter of the plurality of separated holders 3 described later at the completion of the moving closer together of the plurality of separated holders 3. In other words, when the moving closer together of the plurality of separated holders 3 is completed and the plurality of separated holders 3 can no longer further move closer together, the outer diameter of the outer face of the sleeve 2 during the diameter expansion is set larger than an inner diameter of the inner side faces of the plurality of separated holders 3.

In addition, the sleeve 2 is preferably configured such that a plurality of incisions for smooth elastic deformation thereof in the radial direction are formed at predetermined intervals in the circumferential direction to produce a sufficient inner diameter difference and a sufficient outer diameter difference during diameter expansion deformation and during the diameter reduction deformation.

However, the sleeve 2 is elastically deformable only in the example. Even when the sleeve 2 is a solid body or is subjected to plastic deformation close to that of the solid body, as long as deformation is caused by the tightening to allow the sleeve 2 to be assembled, the sleeve 2 can be used as the sleeve 2 of the present invention.

The separated holders 3 are obtained by, e.g., dividing a cylindrical body formed of a rigid material such as, e.g., rust-resistant metal such as stainless steel or brass or a hard synthetic resin in the circumferential direction into a plurality of parts, and is formed in two semi-cylindrical shapes having symmetrical shapes, as illustrated in FIG. 2(*a*). Each of the plurality of separated holders 3, 3 has a pair of circumferential end parts 31 including concave parts 32 facing each other in substantially parallel relation.

The plurality of separated holders 3, 3 are assembled together so as to surround the outer face of the sleeve 2 from the outside. The plurality of separated holders 3, 3 have the plurality of circumferential end parts 31, 31 adjacent to each other in the circumferential direction and the plurality of inner side faces facing the outer face of the elastic sleeve 2 in the radial direction in the assembled state.

The circumferential end parts 31 of each of the plurality of separated holders 3, 3 have at least one pair of end surfaces formed to protrude outwardly in the radial direction from the separated holder 3 such that the respective pairs of the end surfaces face each other in the circumferential direction in substantially parallel relation. The plurality of separated holders 3, 3 are configured such that, even when the plurality of separated holders 3, 3 are in complete contact with each other, spaces are present between the facing end surfaces. In other words, the portions of the individual separated holders 3 facing each other are provided with the concave parts 32. Depths of the concave parts 32 are set such that, when the plurality of separated holders 3, 3 come into complete contact with other, spacers 6 described later are contained therein to be visually unrecognizable from the outside. This serves as an index indicating that the tightening of the plurality of separated holders 3, 3 is surely completed.

The plurality of separated holders 3, 3 have the holder extension parts 33 extending in the hose insertion direction to be longer than the length of the sleeve 2. As can be seen from FIG. 1(*c*) and FIG. 1(*d*), each of the holder extension parts 33 has a shape in which a lateral portion in each of the drawings extends longer than a vertical portion therein. The vertical portion of the holder extension part 33 is designed so as to abut on an abutting part 53 of the grounding clip 5 described later when the separated holders 3 are assembled together. Meanwhile, the lateral portion of the holder extension part 33 is formed with a locking part 34 that is locked to the flange 11 of the nipple 1 to be continued to the lateral portion so as to be unmovable in the axial direction.

Moreover, between the circumferential end parts 31 of the plurality of separated holders 3, 3 adjacent to each other in the circumferential direction, the tightening members 4 described later are provided. As will be understood from FIG. 2(*a*), the plurality of separated holders 3, 3 are configured to be moved closer together in the radial direction by an operation of the tightening members 4 to cause the diameter reduction deformation of the sleeve 2. The inner side faces of the plurality of separated holders 3, 3 are formed as arc surfaces such that the inner side faces of the plurality of separated holders 3, 3 are continued to each other to form a substantially perfect circle when the moving closer together of the plurality of separated holders 3, 3 caused by the tightening members 4 is completed. The inner side faces of the individual separated holders 3 are preferably provided with stepped parts 35 for positioning the sleeve 2 in the axial direction.

As each of the tightening members 4, as illustrated in FIG. 2(*a*), a screw component including a head part 41 having a tool locking part to be locked to a tool (not shown) such as a wrench or spanner, an axial part 42 continued to the head part 41, and a screw part 43 formed in a leading end of the axial part 42, such as a bolt, is preferably used. In the illustrated example, the tool locking part is a locking concave part such as a hexagon socket. The axial part 42 is inserted through a washer.

When the screw component is used as each of the tightening members 4, the screw part is inserted extensively through a through hole provided to be open in either one of the circumferential end parts 31 of the plurality of separated holders 3, 3 adjacent to each other in the circumferential direction and through a screw hole provided to be open in another thereof. To the tool locking part of the screw component in the inserted state, a tool such as a wrench or spanner is locked to be subjected to a rotating operation.

By the rotating operation, the pair of separated holders 3, 3 are moved closer together in the radial direction to cause the diameter reduction deformation of the sleeve 2. Additionally, since the tightening using a relatively small-sized tool such as a wrench or spanner is possible, even the large-diameter hose joint A for connecting the large-diameter hose body B can easily be connected, and assembly and decomposition thereof can easily be performed, and therefore this is also appropriate for maintenance such as cleaning.

In another example, it is also possible to modify the tightening members 4 by using, as each of the tightening members 4, a bolt having the tool locking part in the head part having an outer peripheral surface formed in a polygonal shape such as a hexagon or using a tightening component other than the screw component.

The grounding clip 5 functioning to connect the hose body B to the ground is configured to include a substantially U-shaped part 51, a convex part 52 and the abutting part 53, as illustrated in FIG. 2(*c*). The substantially U-shaped part 51 is preliminarily inserted through the locking hole 12 of the nipple 1 to lock the grounding clip 5 to the nipple 1. The substantially U-shaped part 51 allows the grounding clip 5 to be movable along the hose insertion direction. The convex part 52 is allowed to abut on the conductive carbon line BC of the hose body B, while the abutting part 53 is configured to come into contact with the holder extension part 33.

Figure 3:
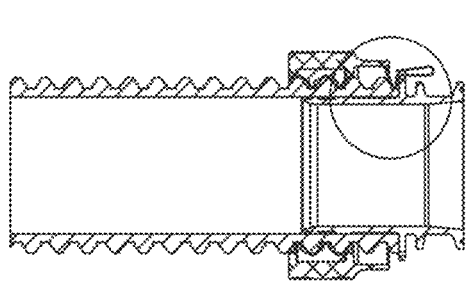
FIG. 3 includes side cross-sectional views and partially enlarged views each illustrating a state of contact between a hose body and a grounding clip.
Figure 3:
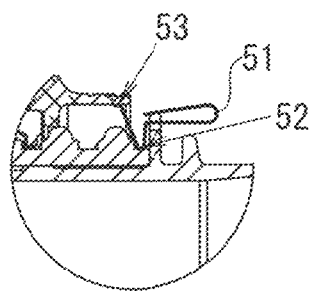
Figure 3:
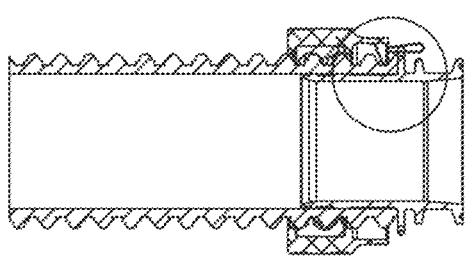
Figure 3:
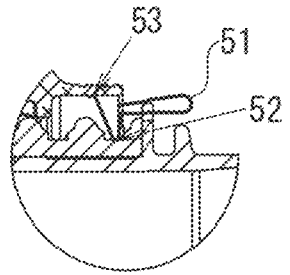
Figure 3:
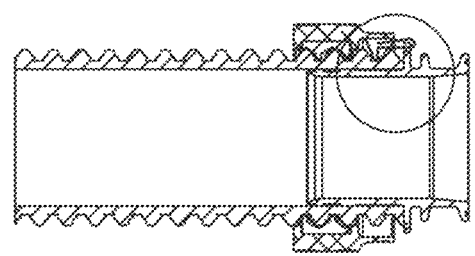
Figure 3:
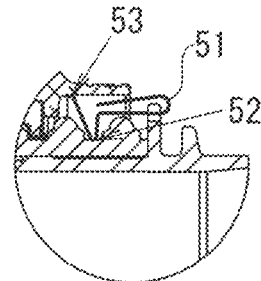

In the present embodiment, the use of the hose body B including the conductive carbon line BC in the axial direction and including the reinforced member provided along the outer surface thereof to spirally protrude is assumed. When the hose body B is cut on site for length adjustment thereof, in terms of a protruding shape of the reinforced member, a position of the conductive carbon line BC that first appears from the connection end part of the hose body B differs in a longitudinal direction. To accommodate this, the grounding clip 5 is designed to be movable along the hose insertion direction. FIG. 3 includes side cross-sectional views and partially enlarged views each illustrating a state of contact between the hose body B and the grounding clip 5, and it will be understood that, regardless of a positional relationship between the connection end part of the hose body B and the protruding shape of the reinforced member at the conductive carbon line BC, the grounding clip 5 is designed to be movable so as to allow the convex part 52 to abut on the conductive carbon line BC of the hose body B.

In addition, the grounding clip 5 has elasticity. The elasticity thereof brings the convex part 52 into strong contact with the conductive carbon line BC of the hose body B and with the holder extension parts 33 of the separated holders 3, and also achieves an effect of reducing the possibility that the grounding clip 5 comes off the nipple 1. In addition, elastic deformation, rather than plastic deformation, is advantageous in terms of breakage and wear in repeated use.

The spacers 6 are components formed of, e.g., a material such as, e.g., a polyacetal resin or another synthetic resin other than that having excellent surface slippage to inhibit partial expansion deformation of the sleeve 2. As illustrated in FIG. 2, the plurality of spacers 6 are disposed between the circumferential end parts 31 of the plurality of separated holders 3, 3 adjacent to each other in the circumferential direction and have guide surfaces 61 that radially face and abut on an excessive part of the sleeve 2 that has undergone the diameter reduction deformation as a result of the moving closer together of the plurality of separated holders 3, 3 caused by the tightening members 4. In addition, the spacers 6 have penetrating parts 62 to be penetrated by the tightening member 4. Note that the composition of the spacers 6 may also be a solid material such as metal other than a resin.

The guide surfaces 61 are surfaces formed to be continued to the inner side faces (arc surfaces) of the plurality of separated holders 3, 3 inside the spacers 6. As illustrated in FIG. 2, the guide surfaces 61 are formed to be wider than the spaces between the end surfaces of the circumferential end parts 31 adjacent to each other in the circumferential direction at the time when the tightening members 4 start tightening. In other words, at the time when the tightening members 4 illustrated in FIG. 2 start tightening, the both ends of the guide surfaces 61 in the circumferential direction and end edges of the inner side faces (arc surfaces) of the plurality of separated holders 3, 3 in the circumferential direction are set to have no space formed therebetween. As each of the penetrating parts 62, not only a through hole illustrated in FIG. 2, but also a notch having a hoe shape or the like is used.

Each of the spacers 6 is colored in a prominent color such as red or a fluorescent color. As described previously, when the plurality of separated holders 3, 3 are brought into complete contact, the spacers 6 are completely contained in the concave parts 32 provided in the circumferential end parts 31 of the separated holders 3 to be visually unrecognizable from the outside. Accordingly, the spacers 6 are preferably colored in a prominent color. Note that, by a cooperation between an action of contact with the inner side faces (arc surfaces) of the separated holders 3 and a state where the penetrating parts 62 are to be penetrated by the tightening member 4, the separated holders 3 are restricted from moving in the radial direction, and consequently the spacers 6 are not exposed from the separated holders 3 and are inevitably contained in the concave parts 32.

As described previously, the hose body B used in the present embodiment is the hose body B including the conductive carbon line BC in the axial direction and includes the reinforced member provided along the outer surface to spirally protrude. Specific examples thereof include a laminated hose (blade hose) in which a plurality of or a single blade (reinforcing yarn) made of a synthetic resin is spirally embedded as an intermediate layer between transparent or opaque outer and inner layers, a spiral reinforced hose in which, as an intermediate layer, a strip-shaped reinforcing material made of a synthetic resin or metal and having a rectangular cross section or the like and a linear reinforcing material having a circular cross section or the like are spirally and integrally wound together, a spiral reinforced hose in which a metal wire rod or a wire rod made of a hard synthetic resin is spirally embedded, and the like. Note that a hose having a certain degree of transparency advantageously allows the conductive carbon line BC to be clearly distinguished and allows a fluid flowing through the inside of the hose body B to be recognized but, even when the hose is opaque, the opaque hose presents no problem as long as the color allows the hose to be clearly distinguished from the conductive carbon line BC.

(Step of Connection of Hose Joint in Embodiment)

Figure 4:
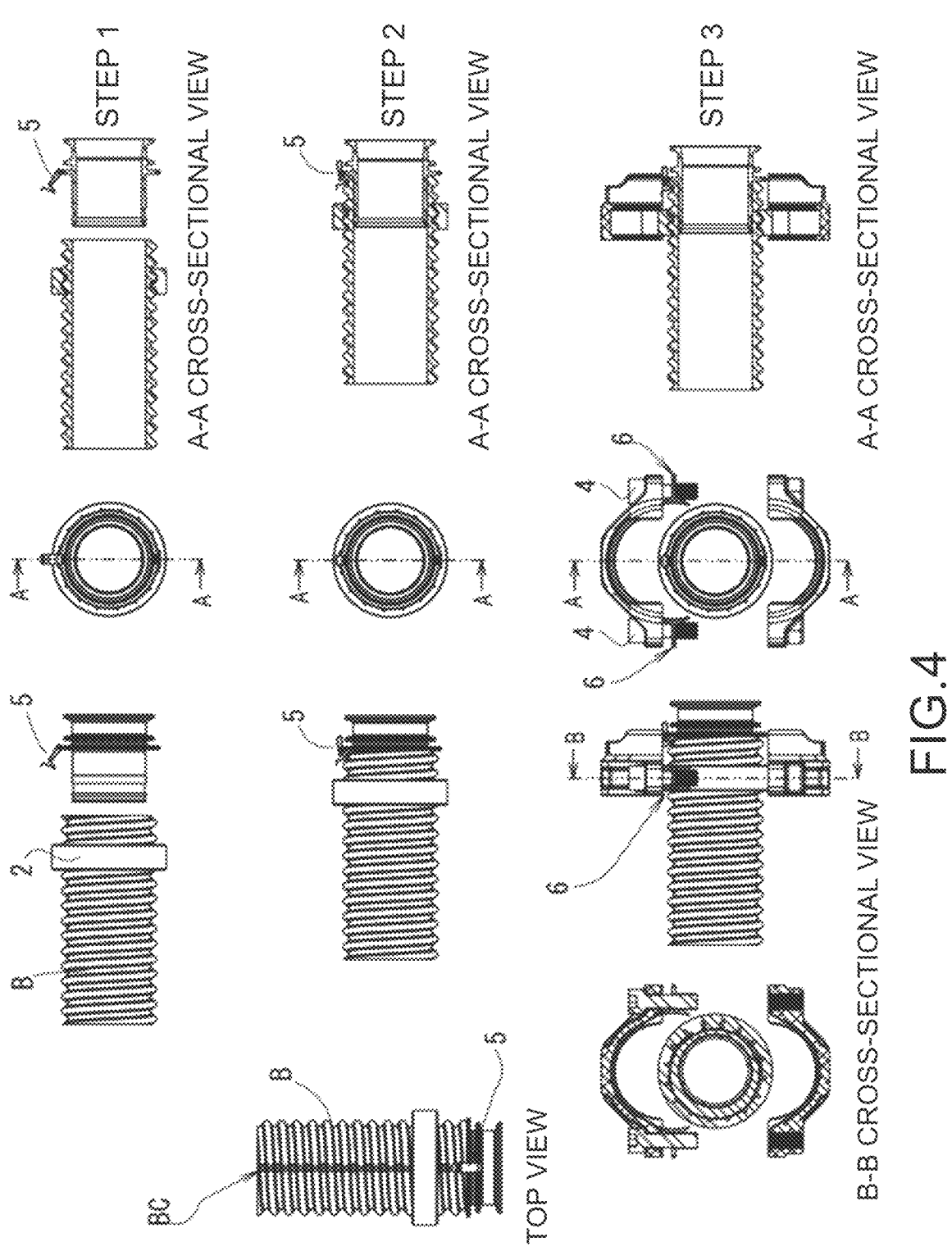
FIG. 4 includes illustrative views illustrating a sequence of connection to the hose body via the hose joint according to the embodiment of the present invention, which illustrates Step 1 to Step 3.
Figure 5:
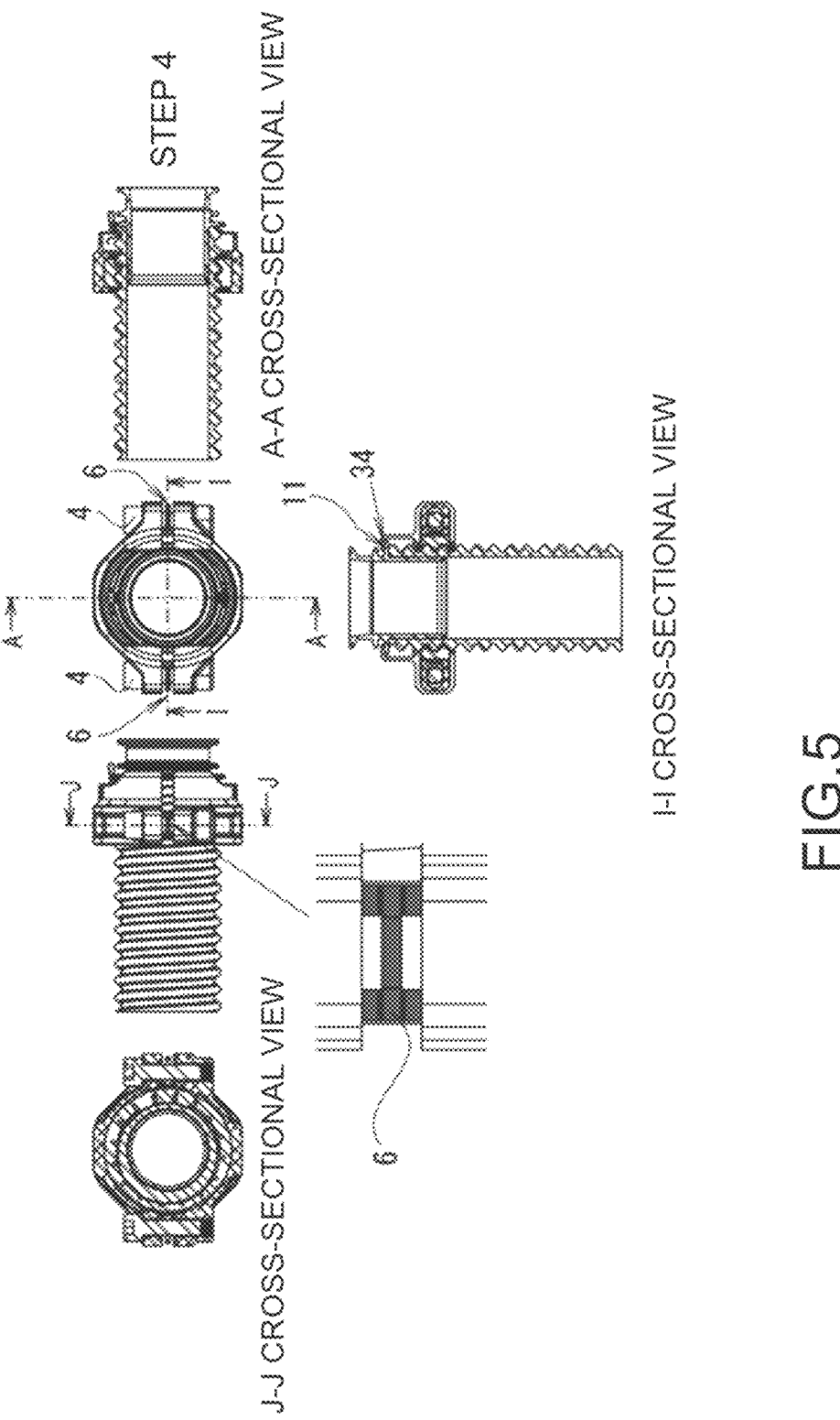
FIG. 5 includes illustrative views illustrating the sequence of connection to the hose body via the hose joint according to the embodiment of the present invention, which illustrates Step 4.
Figure 6:
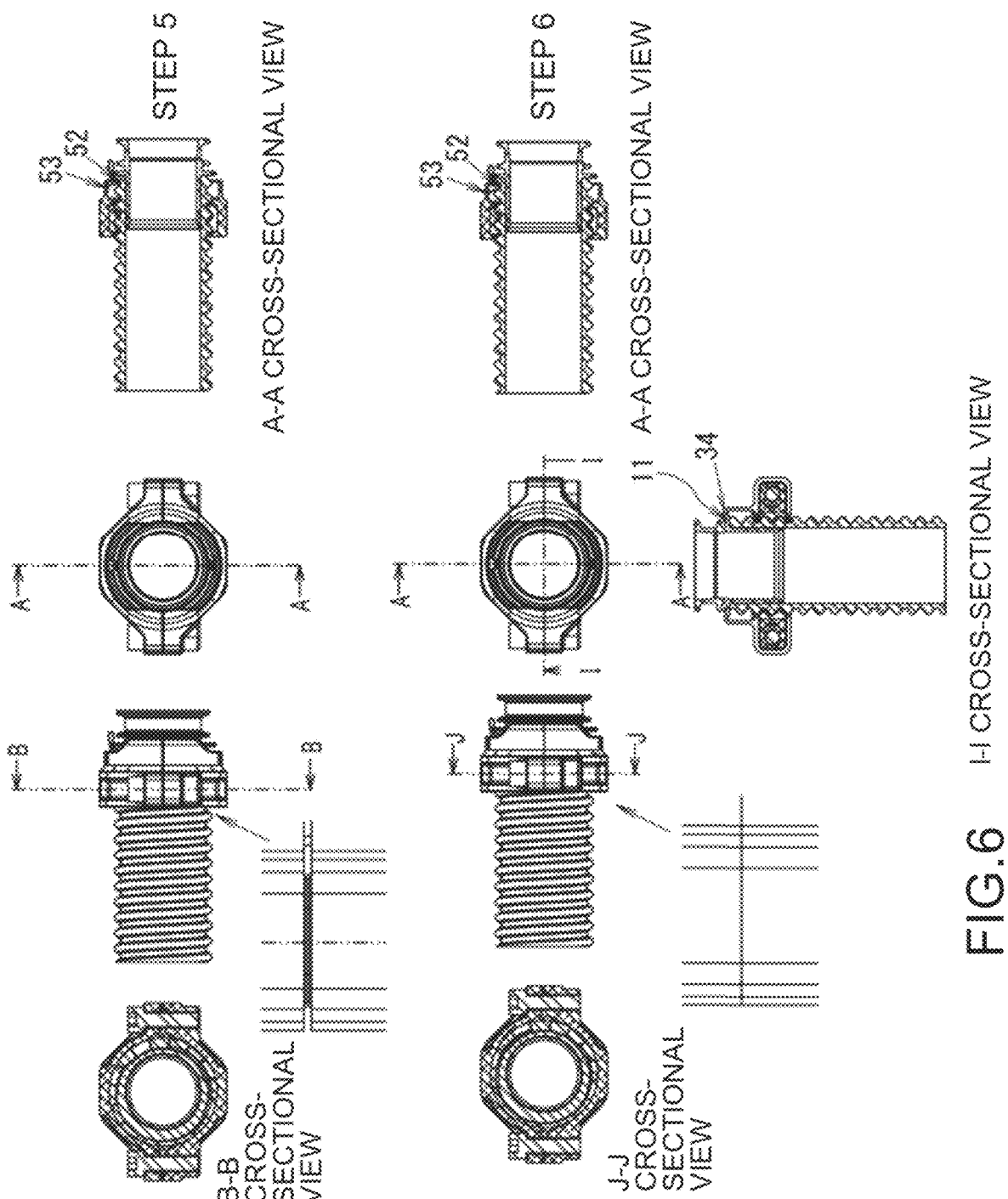
FIG. 6 includes illustrative views illustrating the sequence of connection to the hose body via the hose joint according to the embodiment of the present invention, which illustrates Step 5 and Step 6.

Next, referring to FIG. 4 to FIG. 6, a sequence of connection of the hose joint according to the embodiment of the present invention will be described in detail. In FIG. 4 to FIG. 6, the sequence of connection to the hose body via the hose joint according to the embodiment of the present invention is illustrated as Step 1 to Step 6.

First, in Step 1 illustrated in FIG. 4, as illustrated in FIG. 4, the nipple 1 and the hose body B are prepared, and then the sleeve 2 is inserted into the connection end part of the hose body B.

Then, in Step 2 illustrated in FIG. 4, the hose body B is inserted in the hose insertion direction along the outer peripheral surface of the nipple 1. At the time of insertion, the grounding clip 5 is provisionally fixed (positioned), while the grounding clip 5 and the conductive carbon line BC of the hose body B are aligned with each other (see the top view in Step 2 in FIG. 4).

Then, in Step 3 illustrated in FIG. 4, the plurality of separated holders 3, 3, the tightening members 4, and the spacers 6 are arranged so as to cover the outer face of the sleeve 2 in the circumferential direction. In the drawing, the holder extension parts 33 of the separated holders 3 on a side where through holes are provided to open are arranged on the grounding clip 5 side but, since the separated holders 3 on a side where the screw holes are provided to open are also provided with the holder extension parts 33, even when the vertical positions of the plurality of separated holders 3, 3 are inverted, the grounding connection can be achieved.

Following this, in Step 4 illustrated in FIG. 5, using a hexagonal wrench, the tightening members 4 are screwed to perform provisional fixing. At this time, the separated holders 3 and the nipple 1 are aligned with each other in the hose insertion direction. In other words, as illustrated in an I-I cross-sectional view, the locking parts 34 of the separated holders 3 are hooked onto the flange 11 of the nipple 1. At this time, as illustrated in the left side view, the spacers 6 are in a state where the red color thereof is satisfactorily visually recognizable from between the plurality of separated holders 3, 3.

Then, in Step 5 illustrated in FIG. 6, the tightening members 4 are fully tightened, and the hose body B is compressed with the sleeve 2. At this time, as illustrated in the left side view and the partially enlarged view of Step 5, the spacers 6 are in a state where the red color thereof is still visually recognizable from between the plurality of separated holders 3, 3. This shows that the tightening is not completed. This state is a state where the compression of the hose body B with the sleeve 2 is insufficient and a state where the convex part 52 of the grounding clip 5 is in surface contact with the conductive carbon line BC of the hose body B or is not in contact therewith in terms of a grounding process, which is a state where electrical conductivity performance is low.

By moving the plurality of separated holders 3, 3 closer together in the radial direction with the tightening members 4, the sleeve 2 may undergo the diameter reduction deformation to result in formation of the excessive part. The excessive part gradually increases in size in the radial direction and the axial direction with subsequent diameter reduction deformation of the sleeve 2, and the excessive part having nowhere to go tends to expand toward gaps between the circumferential end parts 31 of the plurality of separated holders 3 adjacent to each other in the circumferential direction. However, the guide surfaces 61 of the spacers 6 abut on the excessive part of the sleeve 2 from the outside thereof in the radial direction to inhibit the expansion of the excessive part, and consequently the excessive part does not enter the gaps between the circumferential end parts 31 of the plurality of separated holders 3, 3 to be induced in the circumferential direction. Thus, it is possible to prevent the excessive part of the sleeve 2 from being caught between the circumferential end parts 31 of the plurality of separated holders 3, 3 and allow the tightening members 4 to tighten up the plurality of separated holders 3, 3.

Finally, in Step 6 illustrated in FIG. 6, the tightening members 4 are screwed until the red color of the spacers 6 is no longer visible through joints between the plurality of separated holders 3, 3. As illustrated in the left side view and the partially enlarged view thereof of Step 6, the spacers 6 are in a state where the red color thereof is completely invisible from the entire surrounding area. The color of the spacers 6 is no longer visible, which achieves an effect of visually notifying completion of a connection operation. In such a situation, the inner faces of the holder extension parts 33 of the separated holders 3 are firmly pressed against the abutting part 53 to bring the grounding clip 5 into a completely compressed state. Since the grounding clip 5 is compressed, the convex part 52 of the grounding clip 5 is firmly pressed against the conductive carbon line BC of the hose body B to satisfactorily ensure the electrical conductivity performance. It will be understood that the spacers 6 have an important function of indicating completion of a tightening operation.

As described previously, the spacers 6 also have an important function of preventing the excessive part of the sleeve 2 from being caught between the separated holders 3. In other words, the presence of the spacers 6 prevents the tightening of the hose body B by the sleeve 2 from being loosened at the excessive part, allows the hose body B to be generally uniformly tightened by the sleeve 2, improves a come-off strength of the hose body B against the nipple 1 in the hose come-off direction, and can reliably prevent a fluid leakage accident to provide excellent safety.

Moreover, since it is possible to prevent the excessive part from being caught between the circumferential end parts 31 of the plurality of separated holders 3, 3 irrespective of the thickness of the sleeve 2, it is possible to more firmly tighten the hose body B with the thick sleeve 2. This can further improve the come-off strength of the hose body B and reliably prevent the fluid leakage accident over a long period.

(Shapes of Components of Hose Joint in Embodiment)

Figure 7:
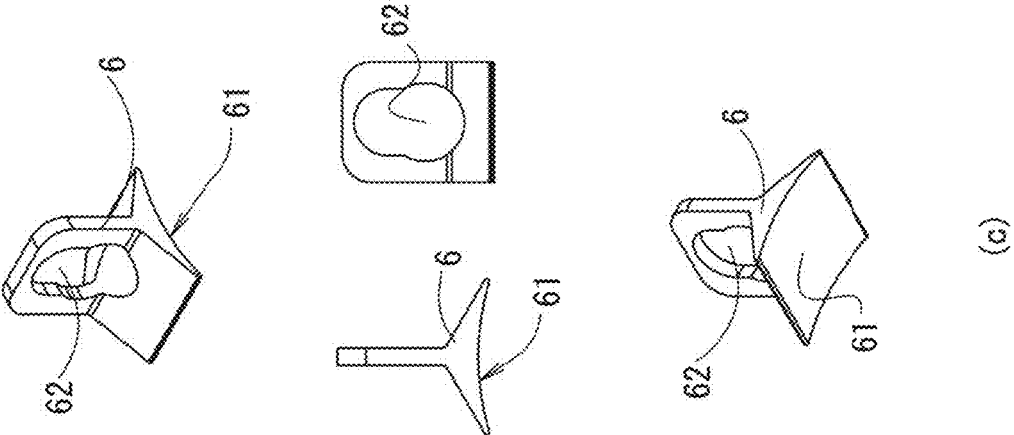
FIGS. 7(*a*)-7(*c*) are diagrams illustrating shapes of a grounding clip and each of spacers which are components of the hose joint according to the embodiment of the present invention, in which FIG. 7(*a*) includes an upper perspective view, a side view, and a lower perspective view each illustrating the shape of the grounding clip, FIG. 7(*b*) includes an upper perspective view, a side view, a front view, and a lower perspective view each illustrating another shape of the grounding clip, and FIG. 7(*c*) includes an upper perspective view, a side view, and a lower perspective view each illustrating the shape of the spacer.
Figure 7:
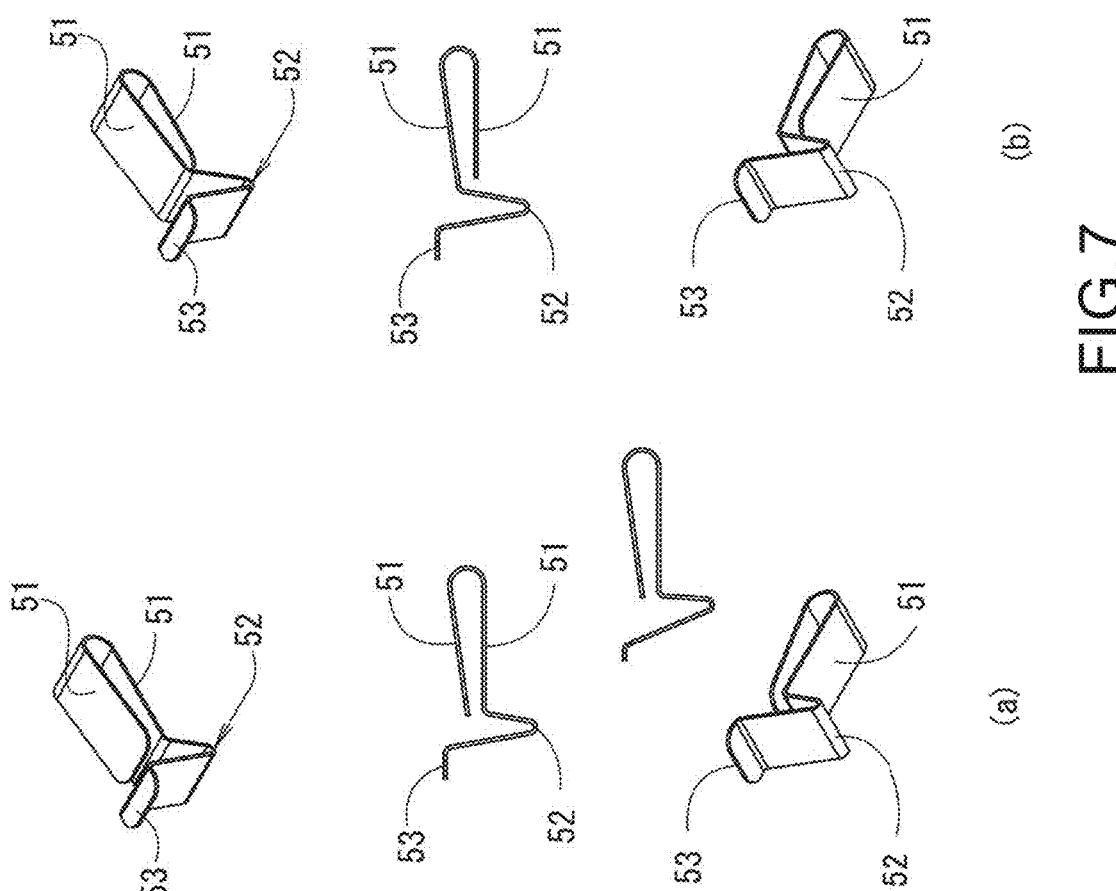

A description will be given particularly of shapes of the grounding clip and the spacer, which are the components of the hose joint according to the embodiment of the present invention. FIG. 7(*a*) includes an upper perspective view, a side view, and a lower perspective view each illustrating the shape of the grounding clip, FIG. 7(*b*) includes an upper perspective view, a side view, and a lower perspective view each illustrating another shape of the grounding clip, and FIG. 7(*c*) includes an upper perspective view, a side view, a front view, and a lower perspective view each illustrating the shape of the spacer.

In the upper perspective view, the side view, and the lower perspective view of FIG. 7(*a*), the grounding clip 5 described heretofore in the embodiment is illustrated. As described previously, the grounding clip 5 is configured to include the substantially U-shaped part 51, the convex part 52, and the abutting part 53. The substantially U-shaped part 51 is set to have a significant length, and the length thereof is set to a length equal to or longer than one pitch of the reinforced member provided along the outer surface of the hose body B to spirally protrude. As a result of such setting, even when the hose body B is cut and the conductive carbon line BC is placed at any angular position in the circumferential direction, it is possible to inevitably bring the convex part 52 of the grounding clip 5 movable in the hose insertion direction into contact with the conductive carbon line BC.

In addition, the grounding clip 5 has elasticity. The elasticity thereof brings the convex part 52 into strong contact with the conductive carbon line BC of the hose body B. For reference, between the side view and the lower perspective view of FIG. 7(*a*), at a position shifted slightly to the right, the grounding clip 5 in a state compressed by the holder extension parts 33 of the separated holders 3 is illustrated.

In the upper perspective view, the side view, and the lower perspective view of FIG. 7(*b*), an example of another shape of the grounding clip 5 is illustrated. The example in FIG. 7(*b*) is different from the example in FIG. 7(*a*) in that, in the example in FIG. 7(*a*), a portion of the substantially U-shaped part 51 which is continued from the convex part 52 has a shape to be inserted through the locking hole 12 of the nipple 1 while, in the example in FIG. 7(*b*), a fold-back portion of the substantially U-shaped part 51 has a shape to be inserted through the locking hole 12. The shape in FIG. 7(*a*) is less likely to be disengaged, since the substantially U-shaped part 51 is inserted into the locking hole 12 from the end part to an inner portion thereof, while the shape in FIG. 7(b) is more likely to be disengaged than the shape in FIG. 7(a) (though not easily disengaged in FIG. 7(b)), since the inserted portion is shallower. Whether the shape less likely to be disengaged is preferable or the shape more likely to be disengaged is preferable differs depending on an intended use, and accordingly, a preferable shape may be selected appropriately.

In the upper perspective view, the side view, the front view (which are arranged to be aligned), and the lower perspective view in FIG. 7(c), the spacers 6 are illustrated. As described previously, each of the spacers 6 has the guide surface 61 that faces and abuts on the excessive part of the sleeve 2 in the radial direction and the penetrating part 62 to be penetrated by the tightening member 4. The opposite side of the guide surface 61 comes into contact with the inner side face (arc surface) of the separated holder 3 but, as illustrated in FIG. 7(c), the spacer 6 is formed in a tapered shape in which the thickness thereof in a direction along the guide surface 61 is large at a center and gradually decreases toward end parts. As the tightening members 4 move the plurality of separated holders 3, 3 closer together, the tapered portion slides. As a result, the spacer 6 smoothly moves inwardly in the radial direction with respect to the tightening member 4, and it is possible to reduce a tightening torque resulting from the tightening members 4. This provides excellent workability and offers an advantage of allowing even a powerless worker, such as a female, to tighten up (completely tighten) the separated holders 3 with the tightening members 4.

The penetrating parts 62 are penetrated by the axial parts 42 and the screw parts 43 of the tightening members 4 at the time of assembly of the spacers 6. However, after the assembly of the spacers 6, inner diameters of the penetrating parts 62 in a shorter direction thereof are set smaller than maximum outer diameters of the head parts 41 and the screw parts 43 of the tightening members 4 and larger than outer diameters of the axial parts 42.

In other words, the entire spacers 6 are formed of an elastically deformable material, and the penetrating parts 62 are formed such that the inner diameters thereof in the shorter direction are slightly smaller than the outer diameters of the screw parts 43 to allow the penetrating parts 62 to undergo expansion and contraction deformation in the shorter direction when the screw parts 43 are inserted. In the illustrated example, each of the penetrating parts 62 is formed in a gourd shape obtained by connecting a larger circular part having a diameter slightly smaller than the outer diameter of each of the screw parts 43 and a smaller circular part having a diameter substantially equal to the outer diameter of each of the axial parts 42.

Figure 8:
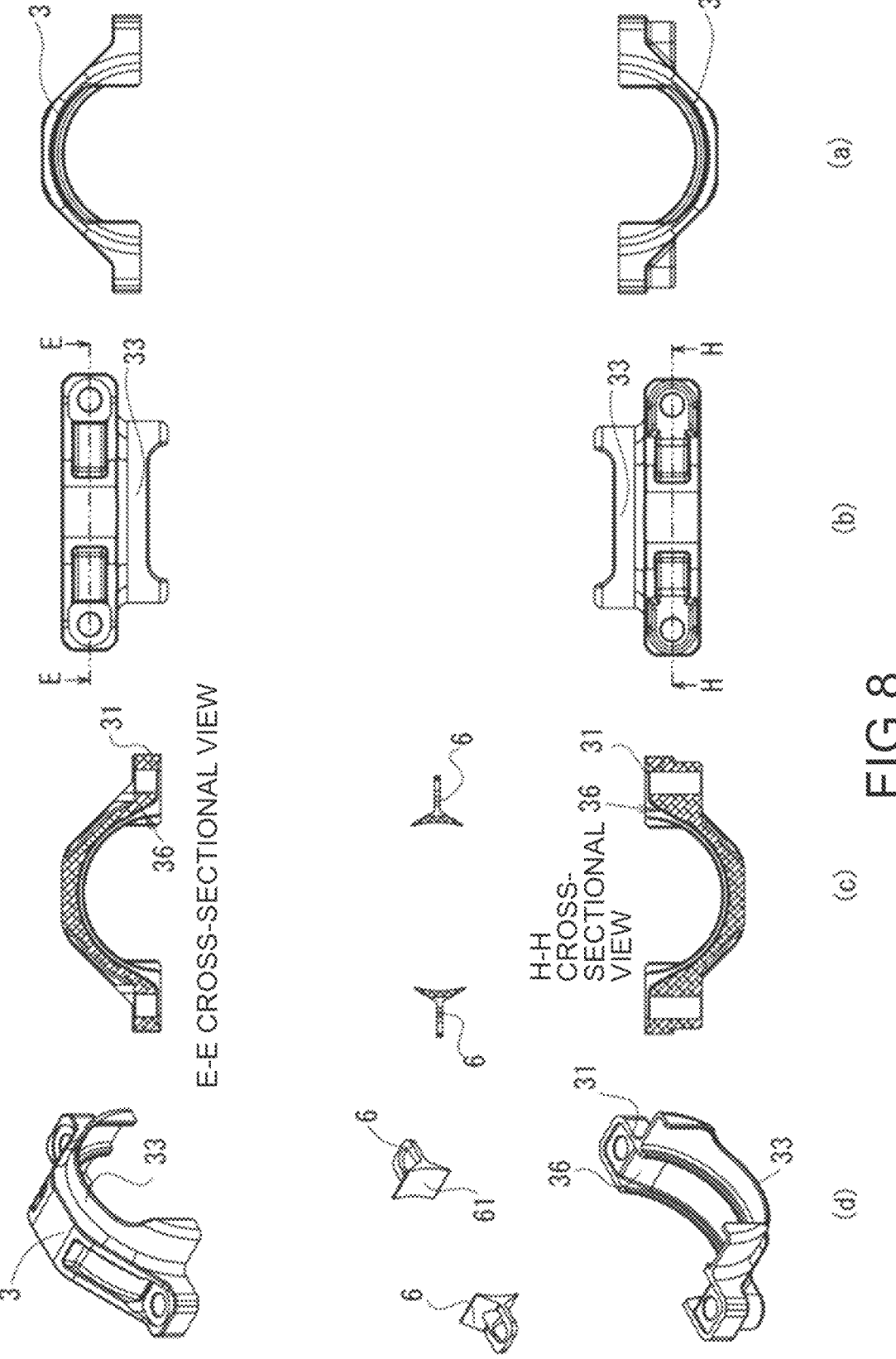
FIGS. 8(*a*)-8(*d*) are diagrams illustrating a detailed shape of each of separated holders which are components of the hose joint according to the embodiment of the present invention, in which FIG. 8(*a*) is a front view, FIG. 8(*b*) includes a top view and a bottom view, FIG. 8(*c*) is a cross-sectional view, and FIG. 8(*d*) is an upper left perspective view.

A description will be given also of a detailed shape of each of the separated holders. FIG. 8 is a diagram illustrating the detailed shape of each of the separated holders which are components of the hose joint according to the embodiment of the present invention, in which FIG. 8(a) is a front view, FIG. 8(b) includes a top view and a bottom view, FIG. 8(c) is a cross-sectional view, and FIG. 8(d) is an upper left perspective view. In some of the views, the spacers are also illustrated. With regard to FIG. 8(b), the separated holder 3 on a side having the through holes to be inserted by the tightening members 4 (not shown) is illustrated in the top view, while the separated holder 3 on a side having the screw holes into which the tightening members 4 (not shown) are to be screwed is illustrated in the bottom view. Note that reference numerals of the individual components and the individual parts are shown only at portions contributing to the description.

As described previously and illustrated in FIG. 8(b), each of the separated holders 3 is provided with the holder extension part 33, and therefore the separated holders 3 can be assembled together without paying particular attention to vertical orientations of the separated holders (in the drawings).

As can be seen from FIG. 8(c) and FIG. 8(d), the inner side face of the portion corresponding to each of the circumferential end parts 31 is formed as a substantially linear recessed part 36 that expands outside an extension line of an arc so as to have a larger diameter. With the recessed part 36, a surface of the spacer 6 opposite to the guide surface 61 comes into contact. As described previously, in a case where the sleeve 2 (not shown) has elasticity, when the plurality of separated holders 3, 3 are moved closer together in the radial direction, due to the diameter reduction deformation of the sleeve 2 (not shown), the excessive part may expand. In a case of a typical separated holder structure with no measures, a situation may be encountered in which the excessive part is caught between the plurality of separated holders during the tightening. However, in the present embodiment, by the recessed part 36 and the spacer 6 placed therein, the excessive part is inhibited from expanding and entering the gaps between the circumferential end parts 31 of the plurality of separated holders 3, 3 to be induced in the circumferential direction. Thus, it is possible to prevent the excessive part of the sleeve 2 (not shown) from being caught between the circumferential end parts 31 of the plurality of separated holders 3, 3 and tighten up the plurality of separated holders 3, 3 with the tightening members 4.

(Configuration of Hose Joint in Another Embodiment)

The hose body B used in each of the embodiments described heretofore includes the conductive carbon line BC in the axial direction and also includes the reinforced member provided along the outer surface to spirally protrude, but the present invention is also applicable to the hose body B having a flat outer surface. A description will be given of another embodiment targeted at the hose body B having the flat outer surface.

Figure 9:
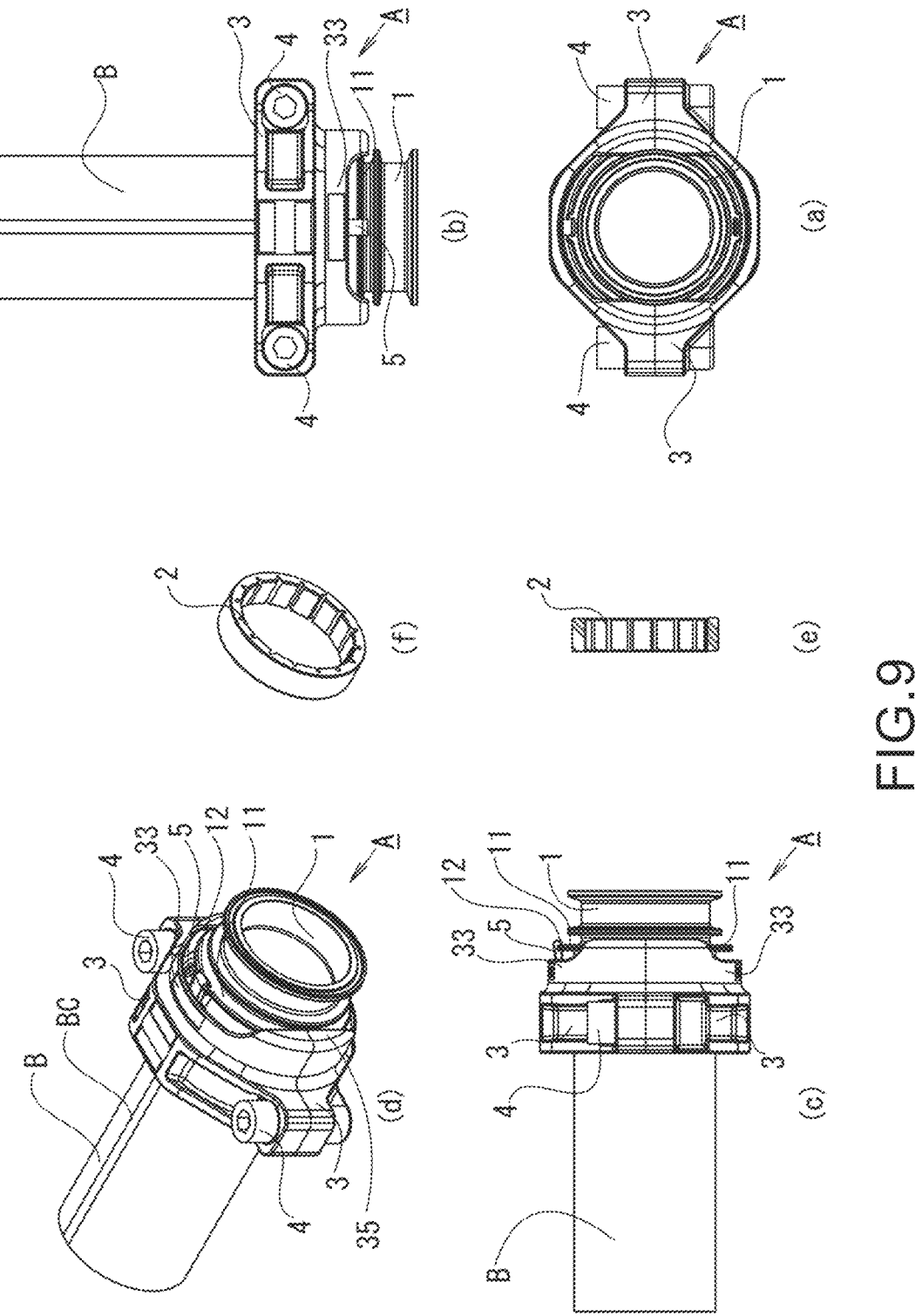

FIG. 9 is an illustrative view illustrating an overall configuration of a hose joint according to the other embodiment of the present invention, in which FIG. 9(a) is a front view, FIG. 9(b) is a top view, FIG. 9(c) is a left side view, FIG. 9(d) is an upper left perspective view, FIG. 9(e) is a side cross-sectional view of a sleeve, which is a component of the hose joint, and FIG. 9(f) is a perspective view of the sleeve.

As illustrated in FIGS. 9(a) to 9(f), the hose joint A according to the other embodiment is a hose joint for inserting, between the nipple 1 and the sleeve 2 deformable in the radial direction, the connection end part of the hose body B having the conductive carbon line BC, covering the outside of the sleeve 2 with the plurality of separated holders 3, and moving the separated holders 3 closer together in the radial direction with the tightening members 4 to connect the separated holders 3 into a cylindrical shape, while simultaneously achieving the grounding connection of the hose body B. However, the hose body B at which the hose joint is targeted is the hose body B having the flat outer surface including no spiral reinforced member.

By moving the plurality of separated holders 3 closer together with the tightening members 4, the sleeve 2 is subjected to the diameter reduction deformation which brings the inner face of the sleeve 2 into substantially even close contact with the outer surface of the connection end part of the hose body B all around the circumference thereof. At the same time, the inner surface of the hose body B is brought into close contact with the outer peripheral surface of the nipple 1 to achieve detachable piping connection. This allows easy connection, easy assembly, and easy decomposition, and therefore this is also appropriate for maintenance such as cleaning. The hose joint A is not limited to mere connection and, when the individual separated holders 3 are connected together, the grounding clip 5 locked to the outer circumference of the nipple 1 comes into contact with the conductive carbon line BC of the hose body B to achieve the grounding connection.

The inner face of the sleeve 2 has an inner diameter during the diameter expansion which is set substantially equal to or slightly larger than the outer diameter of the hose body B, while having an inner diameter during the diameter reduction which is set smaller than the outer diameter of the hose body B. As illustrated in FIG. 9(e) and FIG. 9(f), in the inner face of the sleeve 2, a groove is formed to facilitate the diameter reduction deformation, but a spiral groove as formed in the previous embodiment is not formed therein.

As will be understood from this, the other embodiment is only different in the shape of the sleeve 2, and a configuration thereof is otherwise exactly the same as that of the previous embodiment.

While the hose joint according to each of the embodiments of the present invention has been described in detail with reference to the drawings, and the description has been given of a structure thereof, a specific configuration thereof is not limited to those in these embodiments, and any design change or the like in a scope not departing from the gist of the present invention is included in the present invention. For example, each of the embodiments uses the elastically deformable sleeve, and therefore places the spacers to prevent the excessive part of the sleeve from being caught between the separated holders, but it will easily be understood that, if a solid body sleeve which scarcely forms an excessive part is used, the spacers need not necessarily be placed.

REFERENCE SYMBOLS LIST

A Hose joint
1 Nipple
11 Flange
12 Locking hole
2 Sleeve
3 Separated holder
31 Circumferential end part
32 Concave part
33 Holder extension part
34 Locking part
35 Stepped part
36 Recessed part 4 Tightening member
41 Head part
42 Axial part
43 Screw part
5 Grounding clip
51 Substantially U-shaped part
52 Convex part
53 Abutting part
6 Spacer
61 Guide surface
62 Penetrating part
B Hose body

The invention claimed is:

1. A hose joint for connection of a hose body, the hose joint comprising:
   a nipple provided along an insertion space of the hose body;
   a sleeve deformable in a radial direction thereof and provided so as to surround an outer circumference of the insertion space of the hose body formed along an outer peripheral surface of the nipple;
   a plurality of separated holders provided outside the sleeve to cover an outer face of the sleeve in a circumferential direction thereof and be separable in the radial direction; and
   a tightening member provided to extend across the plurality of separated holders so as to move the individual separated holders closer together in the radial direction and cause diameter reduction of the sleeve,
   the hose joint further comprising a spacer disposed between each of the plurality of separated holders and the sleeve,
   the spacer being visually recognizable through a gap between the plurality of separated holders in a state where tightening is not completed, while the spacer is contained in concave parts of the plurality of separated holders to be completely visually unrecognizable in a state where the tightening is completed.

2. The hose joint according to claim 1,
   wherein the spacer is in contact with an inner circumferential surface of each of the separated holders, while being penetrated by the tightening member, to be completely visually unrecognizable without being exposed from the plurality of separated holders.

3. The hose joint according to claim 1 or 2,
   wherein, the sleeve is an elastically deformable sleeve, and the spacer functions to allow an excessive part, which results from tightening of the elastically deformable sleeve, to escape in the circumferential direction.

4. The hose joint according to claim 2,
   wherein, the sleeve is an elastically deformable sleeve, and the spacer functions to allow an excessive part, which results from tightening of the elastically deformable sleeve, to escape in the circumferential direction.

* * * * *